United States Patent Office
3,746,671
Patented July 17, 1973

3,746,671
AQUEOUS POLYMER DISPERSION, METHOD OF PRODUCING SAME, AND THEIR USE AS BINDERS IN PAPER COATINGS
Herbert Zima and Josef Forstner, Graz, Austria, assignors to Vianova-Kunstharz, A.G., Vienna, Austria
No Drawing. Filed Dec. 14, 1970, Ser. No. 98,187
Int. Cl. C08f 29/42
U.S. Cl. 260—8
5 Claims

ABSTRACT OF THE DISCLOSURE

Aqueous polymer dispersions, and their method of manufacture, for use in combination with natural binders as pigment binders in paper coatings, comprising vinyl acetate, and ethyl acrylate, or higher vinyl esters and mixtures thereof characterized in that 70–95 percent by weight of vinyl acetate
5–30 percent by weight of ethyl acrylate or higher vinyl esters of straight chain monocarboxylic acids with up to 12 carbon atoms or mixtures thereof
0–5 percent by weight of vinylsulfonic acid and/or styrene-sulfonic acid are polymerized in the presence of an emulsifying agent blend consisting essentially of (I) 5–95 percent by weight of an alkylated aromatic hydroxy compound with straight or branched hydrocarbon chain with 6–20 carbon atoms, which has been reacted per each mole with 2–8 moles ethylene oxide or propylene oxide and sulfonated subsequently,
(II) 0–95 percent by weight of an alkylated aromatic hydroxy compound with straight or branched hydrocarbon chain with 6–20 carbon atoms, which has been reacted per each mole with 1–40 moles ethylene oxide or propylene oxide,
(III) 0–95 percent by weight of a compound of the general formula

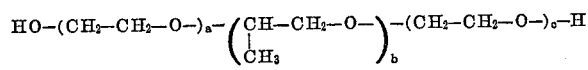

in which $a=2-40$, $b=6-35$, $c=2-40$, the total of emulsifying agents being 100 percent, and in the presence of a redox system as polymerization catalyst, are described.

FIELD OF INVENTION AND BACKGROUND

The present invention is concerned with a process for producing aqueous polymer dispersions, to the obtained dispersions, and with the use of these dispersions in combination with natural binders, as pigment binders in paper coatings.

It is known to produce aqueous paper coatings by mixing pigments with organic binders, such as casein or starch, and co-polymer dispersions. For the printing performance of the coated paper stock, the pigment binding capacity of the polymer dispersion is of substantial importance. Dispersions of co-polymers of butadiene-styrene, styrene-acrylic esters, or co-polymers of various acrylic or methacrylic esters have proven suitable, inter alia. Moreover, in many paper coatings, dispersions of polyvinyl acetate have essential advantages over other copolymer dispersions since they impart deep gloss, brightness, and opacity to the paper. Further, they do not yellow and the dispersions have very low odor characteristics, permitting the use of the coated papers as packing materials.

One of the main problems encountered when using polyvinyl acetate polymer dispersions, however, is the high viscosity of the coating mix, if it contains starch as natural binder. Therefore, dispersions of polyvinyl acetate and starch cannot be used on the modern high-speed coating machines where the coating mix can be applied by various methods, e.g., by roll coating, blade coating, or air knife coating. Particularly roll coating and blade coating systems exert a high shearing stress of the coating mix. With rising demand, the speed of the coating units is increasing and, therefore, the requirements for the binders of the coating mixes are rising as well.

A further characteristic of great importance is a high pick value for the coated stock, specially if it is to be used in offset printing since, as is known, this method requires a much higher surface stability of the paper not only because of the use of highly viscous printing inks on the rubber printing blanket, but also because the water used to keep clear the non-printing dots on the blanket will permeate an inadequately coated paper.

Austrian patent specificaiton No. 253,349 describes copolymer dispersions for paper coatings based on vinyl esters of carboxylic acids. However, due to the content of acrylic esters of alcohols with from 4–8 carbon atoms, the binders show a very poor compatibility with starch and, thus, cannot be used for coating mixes together with starch. Polymer dispersions containing vinyl esters of carboxylic acids with more than 12 carbon atoms, as described for example in British patent specification No. 950,624 or in French patent specification No. 1,497,368, impart unfavorable viscosity characteristics and insufficient stability to coating mixes.

OBJECTS AND GENERAL DESCRIPTION OF INVENTION

Accordingly, it is a primary object of the present invention to prepare polymer dispersions which as pigment binders impart properties to paper coatings which meet the requirements of modern coating methods.

It is a further object of the present invention to develop aqueous polymer dispersions which, particularly in starch containing coating mixes, combine low viscosity with good stability to shearing stress.

It is a further object of the invention to improve the pick values of the coated stock.

The aforesaid and other objects are accomplished as a result of the discovery that dispersions are obtained which meet all of the above-listed requirements if the polymer dispersions are produced by emulsion polymerization of 70–95 parts by weight of vinyl acetate with 5–30 parts by weight of ethyl acrylate and/or vinyl esters of straight chain monocarboxylic acids with up to 12 carbon atoms, preferably vinyl propionate, and/or mixtures thereof, optionally co-employing up to 5 percent by weight and preferably about 2 percent vinyl sulfonic acid or styrene-sulfonic acid, using an emulsifying blend consisting essentially of the following emulsifiers:

(I) 5–95 percent by weight of an alkylated aromatic hydroxy compound with straight or branched hydrocarbon chain with 6-20 carbon atoms, which per each mole has been reacted with 2-8 moles of ethylene oxide or propylene oxide and subsequently sulfonated, (II) 0-95 percent by weight of an alkylated aromatic hydroxy compound with straight or branched hydrocarbon chain with 6-20 carbon atoms, which per each mole has been reacted with 1-40 moles of ethylene oxide or propylene oxide, (III) 0-95 percent by weight of a compound of the general formula

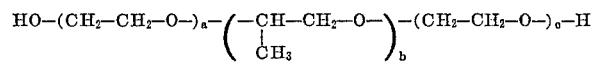

in which $a=2-40$, $b=6-35$, and $c=2-40$, the total of emulsifying agents being 100 percent, and a redox system as polymerization catalyst. Paper coatings containing the polymer dispersions of the invention have low viscosity characteristics even with a solid content of more than 50 percent. The rise in viscosity after a storing time of 24 hours in negligible. The paper coatings are resistant to heat and electrolytes and show good storage stability. They are particularly resistant to shearing stress. Thus, the polymer dispersion paper coatings of the invention are admirably suited for coating with roll coaters or blade coaters. A special advantage of the dispersions of the invention is the fact that paper coatings can be prepared using starch which is the most economical natural binder. The dispersions impart very favorable rheological properties to such mixes.

Besides the improvement of stability, particularly to shearing stress, it is surprising that the pick values of coated paper are also improved, particularly when the dispersions of the invention include from 0.1-5 percent, preferably about 2 percent, vinyl sulfonic acid or styrene sulfonic acid co-polymerized therein. The viscosity characteristics, particularly of coating mixes containing starch, are not adversely affected by this co-employment in the dispersions of the invention.

Suitable co-monomers for vinyl acetate are vinyl propionate or vinyl esters of straight chain monocarboxylic acids with up to 12 carbon atoms or ethyl acrylate or mixtures thereof. The weight ratios of vinyl acetate to the co-monomers may vary from 70:30 to 95:5, and preferably from 80:20 and 90:10. Particularly useful vinyl esters in addition to vinyl propionate are vinyl butyrate, vinyl capronate, or vinyl laurate.

Suitable emulsifying agents for preparing the dispersions of the invention are alkali and ammonium salts of sulfates of aliphatically alkylated and polyoxyethylated aromatic hydroxy compounds such as phenols, naphthols, etc., in combination with aliphatically alkylated and polyoxyethylated aromatic hydroxy compounds or polypropylene glycol polyoxethylates of the general formula

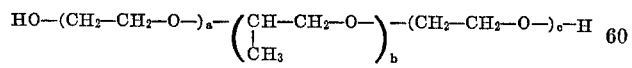

in which $a=2-40$, $b=6-35$, and $c=2-40$.

The preferred catalysts used for the polymerization of the dispersions of the invention are redox systems in combination with alkali peroxodisulfates. Specially suitable are redox systems consisting of ammonium or alkali peroxodisulfates and ammonium or alkali bisulfates or sodiumdithionite or ascorbic acid.

According to the process of the invention all reactants are emulsified. A part of the emulsions is charged to the reaction vessel, the peroxide of the redox system is added and the batch is heated to reaction temperature. The remainder of the emulsion is mixed with the second component of the redox system and this mixture is continuously added. By this process the obtained dispersion, also with starch as natural binder, will yield low viscous paper coatings.

The coating formulations preferably have a solids content of between 25-55 percent. The proportion of polymer dispersion lies between 2 and 30 percent, the pigment content between 50-95 percent of the total solids of the mix. The content of natural binder can be up to 40 percent of total solids of hydrolyzed starch, casein, or polyvinyl-alcohol or blends thereof.

Pigments commonly employed for coating colors are useful herein, including kaolin, china clay, satin white, barium sulfate, calcium carbonate, titanium dioxide, etc. Furthermore, the coatings may contain additives, such as dispersing agents, dye-stuffs, anti-foaming agents, waxes, of plasticizers. Suitable dispersing agents are, e.g., salts of polyacrylic acid, high molecular weight water-soluble polyphosphates. The dispersions of the invention can be used as binders for coating mixes for coating paper and other fibrous web, etc.

EXAMPLES

The following examples are set forth to illustrate the invention. However, they are not to be construed as limiting its scope. All parts are by weight unless otherwise indicated. Examples 1-15 exemplify the preparation of the dispersions, and Example 16 the preparation of coating formulations using the dispersions.

Examples 1-15

The proportions of reactants for these examples are tabulated in Table I.

In an emulsifying stirring vessel, 700 parts of water, the emulsifier blend, and the monomers are emulsified. 180 parts of the emulsion are charged to a polymerization vessel, 2 parts ammonium peroxodisulfate are added and the charge is heated to 60° C. To the rest of the emulsion in the emulsifying vessel, 2 parts of sodium bisulfite are added (in Example 12 the sodium bisulfite is replaced by 2 parts ascorbic acid) and the emulsion is continuously added over a period of 90 minutes, during which the reaction temperature is slowly raised to 75° C. At the end of the addition, 0.5 part potassium peroxodisulfate are added over a period of 40 minutes, the temperature being slowly raised to 90° C. Then, the temperature is lowered to 85° C. and held for another 30 minutes whereby air is sucked over the charge. After cooling, a very stable dispersion with a solid content of about 50 percent is obtained.

LEGEND FOR TABLE I

Emulsifiers:

A=octylphenol, reacted with 2 moles ethylene oxide and sulfonated
　B=octylphenol, reacted with 3 moles ethylene oxide and sulfonated
　C=octylphenol, reacted with 6 moles ethylene oxide and sulfonated
　D=nonylphenol, reacted with 8 moles ethylene oxide
　E=octylphenol, reacted with 1 mole ethylene oxide
　F=octylphenol, reacted with 40 moles ethylene oxide
　G=Pluronic® L 61 marketed by the Wyandotte Chemical Corporation which is an emulsifier of the general Formula III hereinbefore, containing 10 percent polyoxyethylene and polyoxypropylene, the polyoxypropylene portion having a molecular weight of 1750.

Monomers:
　VAC=vinyl acetate
　VPR=vinyl propionate
　EAC=ethyl acrylate
　VB=vinyl butyrate
　VL=vinyl laurate
　NVS=sodium vinylsulfonate

TABLE I

| Example | Emulsifier blend, parts by weight | | | | | | | Monomer blend, parts by weight | | | | | |
|---|---|---|---|---|---|---|---|---|---|---|---|---|---|
| | A | B | C | D | E | F | G | VAC | VPR | EAC | VB | VL | NVS |
| 1 | 11.3 | | | 8.4 | | | | 600 | 148 | | | | |
| 2 | 11.3 | | | 8.4 | | | | 600 | 148 | | | | 15 |
| 3 | 11.3 | | | 8.4 | | | | 600 | | 148 | | | |
| 4 | 11.3 | | | 8.4 | | | | 600 | | 148 | | | 15 |
| 5 | | 11.3 | | 8.4 | | | | 600 | 148 | | | | |
| 6 | | | 11.3 | 8.4 | | | | 600 | 148 | | | | 15 |
| 7 | 11.3 | | | | 8.4 | | | 600 | 148 | | | | |
| 8 | | | | 11.3 | | 8.4 | | 600 | 148 | | | | |
| 9 | | | | 11.3 | | 8.4 | | 600 | 148 | | | | 15 |
| 10 | 11.3 | | | | | | 8.4 | 600 | 148 | | | | |
| 11 | 11.3 | | | | | | 8.4 | 600 | 148 | | | | 15 |
| 12 | 11.3 | | | 8.4 | | | | 600 | | | 148 | | |
| 13 | 11.3 | | | 8.4 | | | | 600 | | | 148 | | 15 |
| 14 | 11.3 | | | 8.4 | | | | 673 | | | | 75 | |
| 15 | 11.3 | | | 4.2 | | 4.2 | | 600 | | 148 | | | |

Example 16

(a) Coating colors using starch are prepared from 100 parts English China Clay SPS; 10 or 15 parts respectively of starch (Farinex TSC, 20 percent solution, dissolved at 80–90° C.); 0.8 parts of the sodium salt of polyacrylic acid (Polysalz of BASF); and 10 or 15 parts respectively of the dispersions of the invention. The dispersing agent is dissolved in water, china clay is added with stirring and a uniform slurry is formed. Next the starch is added. After stirring for a short duration, the dispersion is added and the pH-value is adjusted to 9 with 5 percent aqueous NaOH.

(b) Coating mixes are prepared using casein as natural binder from 70 parts of English China Clay SPS; 30 parts calcium carbonate (Millicarb); 0.8 parts sodium salt of polyacrylic acid (Polysalz of BASF); 4 parts casein (milk casein); 12.5 parts dispersion, and 0.4 parts calcium stearate (Nopcote C 104). Before admixing, the casein is dissolved in aqueous NaOH at 50° C. The pH-value of the coating is adjusted to 9 with 5 percent aqueous NaOH.

Table II shows the viscosities of the coating colors. The viscosities were measured with a Brookfield Viscometer, type RVT 100.

TABLE II

| Dispersion of example | Ratio, parts by wt. | | Solid content, percent | Viscosity Brookfield Spindle No 5, 100 r.p.m., cp. |
|---|---|---|---|---|
| | Starch | Dispersion | | |
| 1 | 10 | 10 | 46 | 265 |
| 1 | 15 | 5 | 45 | 380 |
| 2 | 10 | 10 | 45 | 280 |
| 2 | 15 | 5 | 45 | 385 |
| 3 | 10 | 10 | 46 | 350 |
| 3 | 15 | 5 | 46 | 385 |
| 5 | 10 | 10 | 47 | 360 |
| 5 | 15 | 5 | 47 | 410 |
| 6 | 10 | 10 | 47 | 860 |
| 6 | 15 | 5 | 47 | 620 |
| 7 | 10 | 10 | 47 | 330 |
| 7 | 15 | 5 | 47 | 445 |
| 8 | 10 | 10 | 47 | 280 |
| 8 | 15 | 5 | 47 | 520 |
| 10 | 10 | 10 | 46 | 295 |
| 12 | 10 | 10 | 52 | 1,050 |
| 12 | 15 | 5 | 47 | 430 |
| 15 | 10 | 10 | 47 | 360 |
| | Casein | | | |
| 1 | 4 | 12.5 | 52 | 245 |
| 3 | 4 | 12.5 | 52 | 200 |

Pick values of coating formulations: For determining the pick values, coating colors with 45 percent solid content are prepared according to Exaample 16a with a ratio of natural binder to polymer dispersion of 10:10 and 15:5, respectively. Coating mixes prepared from dispersions of Examples 1, 2, 3, 8, 10, and 15 are used to coat stock with a coat weight of 9 g./m². From the polymer dispersions of Examples 1, 3, 8, 10, and 15, coating mixes are prepared with casein according to Example 16b. The coated stock is calendered with a super calender and then equilibrated for 24 hours according to TAPPI standards, at 20° C. and 65 percent relative air humidity. The pick values are measured with an IGT tester. The method of the tester is described in TAPPI, vol. 40 (1957), 10, p. 749 ff. The pick values set forth in Table III are averages of 5 determinations.

TABLE III

| Dispersion Ex. No. | Solids, percent | Binder/dispersion ratio | | Pick value, cm./sec. |
|---|---|---|---|---|
| | | Starch | Casein | |
| 1 | 45 | 10:10 | | 38 |
| 1 | 45 | 15:5 | | 45 |
| 1 | 50 | | 10:10 | 48 |
| 2 | 45 | 10:10 | | 52 |
| 2 | 45 | 15:5 | | 50 |
| 3 | 45 | 10:10 | | 40 |
| 3 | 50 | | 10:10 | 48 |
| 8 | 45 | 10:10 | | 40 |
| 8 | 50 | | 10:10 | 50 |
| 10 | 45 | 10:10 | | 44 |
| 10 | 50 | | 10:10 | 54 |
| 15 | 45 | 10:10 | | 40 |
| 15 | 50 | | 10:10 | 44 |

From the data in Tables II and III it is seen that the viscosity characteristics of coatings as well as their pick value are extremely good for coatings prepared with dispersions made in accordance with this invention. It will be apparent to one skilled in the art that various modifications can be made in the preparation of the dispersions of the type defined herein and in the coating materials made with the dispersions without departing from the presently disclosed concept. Such embodiments being within the ability of one skilled in the art are within the scope of the present invention which is to be limited only by the appended claims.

It is claimed:

1. An aqueous polymer dispersion compatible with components of paper coatings including starch and casein and having a viscosity of less than about 1050 as measured by the Brookfield Viscosimeter, type RVT 100, prepared from monomers consisting essentially of:

70–95 percent by weight of vinyl acetate,

5–30 percent by weight of ethyl acrylate or higher vinyl esters of straight chain monocarboxylic acids with up to 12 carbon atoms or mixtures thereof, and 0–5 percent by weight of vinylsulfonic acid and/or styrene-sulfonic acid, said dispersion being characterized in that said monomers were polymerized by emulsion polymerization in the presence of an emulsifying agent blend consisting essentially of (I) 5–95 percent by weight of an alkylated aromatic hydroxy compound with straight or branched hydrocarbon chain with 6–20 carbon atoms, which has been reacted per each mole with 2–8 moles ethylene oxide or propylene oxide and sulfonated subsequently, (II) 0–95 percent by weight of an alkylated aromatic hydroxy compound with straight or branched hydrocarbon chain with 6–20 carbon atoms, which has been reacted per each mole with 1–40 moles ethylene oxide or propylene oxide, (III) 0–95 percent by weight of a compound of the general formula

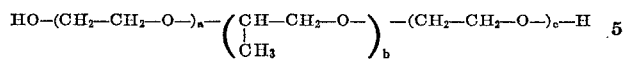

in which $a=2-40$, $b=6-35$, $c=2-40$, the total of emulsifying agents being 100 percent and in the presence of a redox system as polymerization catalyst.

2. The dispersion of claim 1 characterized in that vinyl acetate is co-polymerized with vinyl propionate or with a mixture including vinyl propionate.

3. The dispersion of claim 1 characterized in that 1–2 percent by weight of sodium vinylsulfonate is included in the polymer.

4. A stable coating composition consisting essentially of an admixture of the dispersion of claim 1 and a binder selected from the group consisting of starch and casein.

5. The dispersion of claim 1 characterized in that the redox system as polymerization catalysts consists of ammonium or alkali peroxodisulfate and ammonium or alkali bisulfite or sodium dithionite or ascorbic acid.

References Cited
UNITED STATES PATENTS

| | | | |
|---|---|---|---|
| 3,080,333 | 3/1963 | Kray et al. | 260—29.6 T |
| 3,318,830 | 5/1967 | Condon et al. | 260—29.6 TA |
| 3,404,112 | 10/1968 | Lindemann et al. | 260—29.6 T |
| 3,423,353 | 1/1969 | Levine et al. | 260—29.6 T |
| 3,594,336 | 7/1971 | Bergmeister et al. | 260—29.6 MQ |

WILLIAM H. SHORT, Primary Examiner

L. M. PHYNES, Assistant Examiner

U.S. Cl. X.R.

260—17.4 ST, 29.6 TA, 29.6 T, 29.6 MQ, 41 B; 117—155 UA

UNITED STATES PATENT OFFICE
CERTIFICATE OF CORRECTION

Patent No. 3,746,671　　　　　　　　　　Dated　July 17, 1973

Inventor(s)　Herbert Zima et al

It is certified that error appears in the above-identified patent and that said Letters Patent are hereby corrected as shown below:

Column 1, in the heading, add the claim for priority as follows:

-- Claims Priority of Austrian Application Nos. A11892/69 and A11893/69 filed December 19, 1969; and Austrian Application Nos. A6227/70 and A6228/70 filed July 9, 1970 --;

Column 1, lines 32-33, "subquently" should read -- subsequently --.
Column 3, line 72, "emulsions" should read -- emulsion --.
Column 8, line 2, claim 5, "catalysts" should read -- catalyst --. Column 4, line 17, "of", first occurrence, should read -- or --.

Signed and sealed this 17th day of September 1974.

(SEAL)
Attest:

McCOY M. GIBSON JR.　　　　　　　　C. MARSHALL DANN
Attesting Officer　　　　　　　　　　Commissioner of Patents